(12) United States Patent
Sekikawa et al.

(10) Patent No.: US 12,304,473 B2
(45) Date of Patent: May 20, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Atsuhiro Sekikawa, Wako (JP); Shotaro Taniguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 457 days.

(21) Appl. No.: 17/680,357

(22) Filed: Feb. 25, 2022

(65) Prior Publication Data
US 2022/0306094 A1    Sep. 29, 2022

(30) Foreign Application Priority Data

Mar. 29, 2021 (JP) .................................. 2021-055803

(51) Int. Cl.
*B60W 30/095* (2012.01)
*B60Q 9/00* (2006.01)
*B60W 50/14* (2020.01)

(52) U.S. Cl.
CPC ......... *B60W 30/0956* (2013.01); *B60Q 9/008* (2013.01); *B60W 50/14* (2013.01); *B60W 2540/225* (2020.02); *B60W 2552/10* (2020.02); *B60W 2554/4041* (2020.02); *B60W 2710/20* (2013.01); *B60W 2720/10* (2013.01)

(58) Field of Classification Search
None
See application file for complete search history.

(56) References Cited

U.S. PATENT DOCUMENTS 9,616,809 B1 * 4/2017 Alasry ................... G08G 1/167
2012/0271484 A1 * 10/2012 Feit ........................ G01S 13/931
701/1

(Continued)

FOREIGN PATENT DOCUMENTS

CN    109466542    3/2019
CN    109795498    5/2019

(Continued)

OTHER PUBLICATIONS

Chinese Office Action for Chinese Patent Application No. 202210183419.X mailed Jan. 6, 2025.

*Primary Examiner* — Amelia Vorce
(74) *Attorney, Agent, or Firm* — Amin, Turocy & Watson, LLP (57) ABSTRACT

A vehicle control method includes recognizing another vehicle present in the surroundings of an own vehicle, detecting an orientation of a face or a line of sight of a driver of the own vehicle, on the basis of a position of the other vehicle present in a second lane adjacent to a first lane in which the own vehicle is present, outputting predetermined information indicating that the other vehicle is present in the second lane, performing automated driving for controlling at least one of a speed or steering of the own vehicle on the basis of the recognition result and the detection result and reducing a level of the automated driving in a case where the orientation is not within an allowable range, and determining the allowable range on the basis of the orientation after the predetermined information is output.

10 Claims, 7 Drawing Sheets

(56) References Cited

U.S. PATENT DOCUMENTS

| | | | | |
|---|---|---|---|---|
| 2019/0023273 | A1* | 1/2019 | Ishioka | G08G 1/167 |
| 2019/0073540 | A1 | 3/2019 | Yamada et al. | |
| 2019/0143968 | A1* | 5/2019 | Song | B60W 10/18 |
| 2019/0147265 | A1 | 5/2019 | Aizawa et al. | |
| 2019/0329791 | A1* | 10/2019 | Oba | B60W 50/12 |
| 2020/0122745 | A1* | 4/2020 | Tivesten | B60K 35/10 |
| 2021/0146943 | A1 | 5/2021 | Oniwa et al. | |
| 2021/0237743 | A1* | 8/2021 | Boström | G06V 20/588 |
| 2021/0370981 | A1* | 12/2021 | Inagaki | G08G 1/16 |
| 2022/0063634 | A1* | 3/2022 | Sato | G06V 40/161 |
| 2022/0063652 | A1* | 3/2022 | Taylor | B60W 30/14 |

FOREIGN PATENT DOCUMENTS

| | | |
|---|---|---|
| CN | 110678371 | 1/2020 |
| JP | 2019-091272 | 6/2019 |
| WO | 2019/105762 | 6/2019 |

\* cited by examiner

| DRIVING MODE | CONTROL STATE | TASK | |
|---|---|---|---|
| MODE A | AUTOMATED DRIVING | FRONT MONITORING: UNNECESSARY STEERING GRIPPING: UNNECESSARY | ↑ TASK:LIGHT |
| MODE B | DRIVING ASSISTANCE | FRONT MONITORING: NECESSARY STEERING GRIPPING: UNNECESSARY | |
| MODE C | DRIVING ASSISTANCE | FRONT MONITORING: NECESSARY STEERING GRIPPING: NECESSARY | |
| MODE D | DRIVING ASSISTANCE | FRONT MONITORING: NECESSARY AT LEAST CERTAIN DEGREE OF DRIVING OPERATION IS NECESSARY | |
| MODE E | MANUAL DRIVING | FRONT MONITORING: NECESSARY BOTH STEERING AND ACCELERATION/DECELERATION REQUIRE DRIVING OPERATIONS | ↓ TASK:HEAVY |

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2021-055803, filed Mar. 29, 2021, the entire contents of which is incorporated herein by reference.

BACKGROUND

Field of the Invention

The present invention relates to a vehicle control device, a vehicle control method, and a storage medium.

Description of Related Art

It is being examined to impose a duty of front monitoring on a driver according to a level of automated driving. In connection with this, a technique for determining a driver's state such as looking aside is known (refer to, for example, Japanese Unexamined Patent Application, First Publication No. 2019-91272).

SUMMARY

However, in the technique of the related art, the accuracy of determining whether a driver is monitoring the front or looking aside is not sufficient.

One aspect of the present invention is made in consideration of such circumstances, and one object thereof is to provide a vehicle control device, a vehicle control method, and a storage medium capable of improving the determination accuracy of front monitoring by a driver.

A vehicle control device, a vehicle control method, and a storage medium according to the present invention have the following configurations.

According to one aspect (1) of the present invention, a vehicle control device is provided including a recognizer that recognizes another vehicle present in the surroundings of an own vehicle; a detector that detects an orientation of a face or a line of sight of a driver of the own vehicle; an output controller that causes an outputter to, on the basis of a position of the other vehicle recognized by the recognizer and present in a second lane adjacent to a first lane in which the own vehicle is present, output predetermined information indicating that the other vehicle is present in the second lane; a driving controller that performs automated driving for controlling at least one of a speed or steering of the own vehicle on the basis of the recognition result from the recognizer and the detection result from the detector, and reduces a level of the automated driving in a case where the orientation detected by the detector is not within an allowable range; and a determiner that determines the allowable range on the basis of the orientation detected by the detector after the predetermined information is output by the outputter.

According to an aspect (2), in the vehicle control device of the above aspect (1), the outputter is an indicator installed on a mirror surface of a door mirror of the own vehicle or near the door mirror in a vehicle cabin of the own vehicle, in a case where the recognizer recognizes that the other vehicle is present behind the own vehicle in the second lane, the output controller turns on or flashes the indicator, and the determiner determines the allowable range such that the allowable range includes the indicator in a case where the detector detects that the driver has turned his/her face or line of sight to the indicator after turning on or flashing of the indicator.

According to an aspect (3), in the vehicle control device of the above aspect (2), the determiner determines the allowable range in a case where the number of times for which the driver turns his/her face or line of sight to the indicator reaches a predetermined number of times.

According to an aspect (4), in the vehicle control device of any one of the above aspects (1) to (3), the driving controller reduces the level of the automated driving in a case where the driver keeps his/her face or line of sight out of the allowable range for a predetermined time or longer.

According to another aspect (5) of the present invention, a vehicle control method is provided of causing a computer mounted an own vehicle to recognize another vehicle present in the surroundings of the own vehicle; detect an orientation of a face or a line of sight of a driver of the own vehicle; cause an outputter to, on the basis of a position of the recognized other vehicle present in a second lane adjacent to a first lane in which the own vehicle is present, output predetermined information indicating that the other vehicle is present in the second lane; perform automated driving for controlling at least one of a speed or steering of the own vehicle on the basis of the recognition result of the other vehicle and the detection result of the face or the line of sight of the driver, and reduce a level of the automated driving in a case where the orientation detected by the detector is not within an allowable range; and determine the allowable range on the basis of the orientation detected after the predetermined information is output by the outputter.

According to still another aspect (6) of the present invention, a non-transitory storage medium is provided storing computer-readable instructions for causing a computer mounted on an own vehicle to execute recognizing another vehicle present in the surroundings of the own vehicle; detecting an orientation of a face or a line of sight of a driver of the own vehicle; causing an outputter to, on the basis of a position of the recognized other vehicle present in a second lane adjacent to a first lane in which the own vehicle is present, output predetermined information indicating that the other vehicle is present in the second lane; performing automated driving for controlling at least one of a speed or steering of the own vehicle on the basis of the recognition result of the other vehicle and the detection result of the face or the line of sight of the driver, and reducing a level of the automated driving in a case where the orientation detected by the detector is not within an allowable range; and determining the allowable range on the basis of the orientation detected after the predetermined information is output by the outputter.

According to any of the above aspects, it is possible to improve the determination accuracy of front monitoring by a driver.

DESCRIPTION OF EMBODIMENTS

Figure 1:
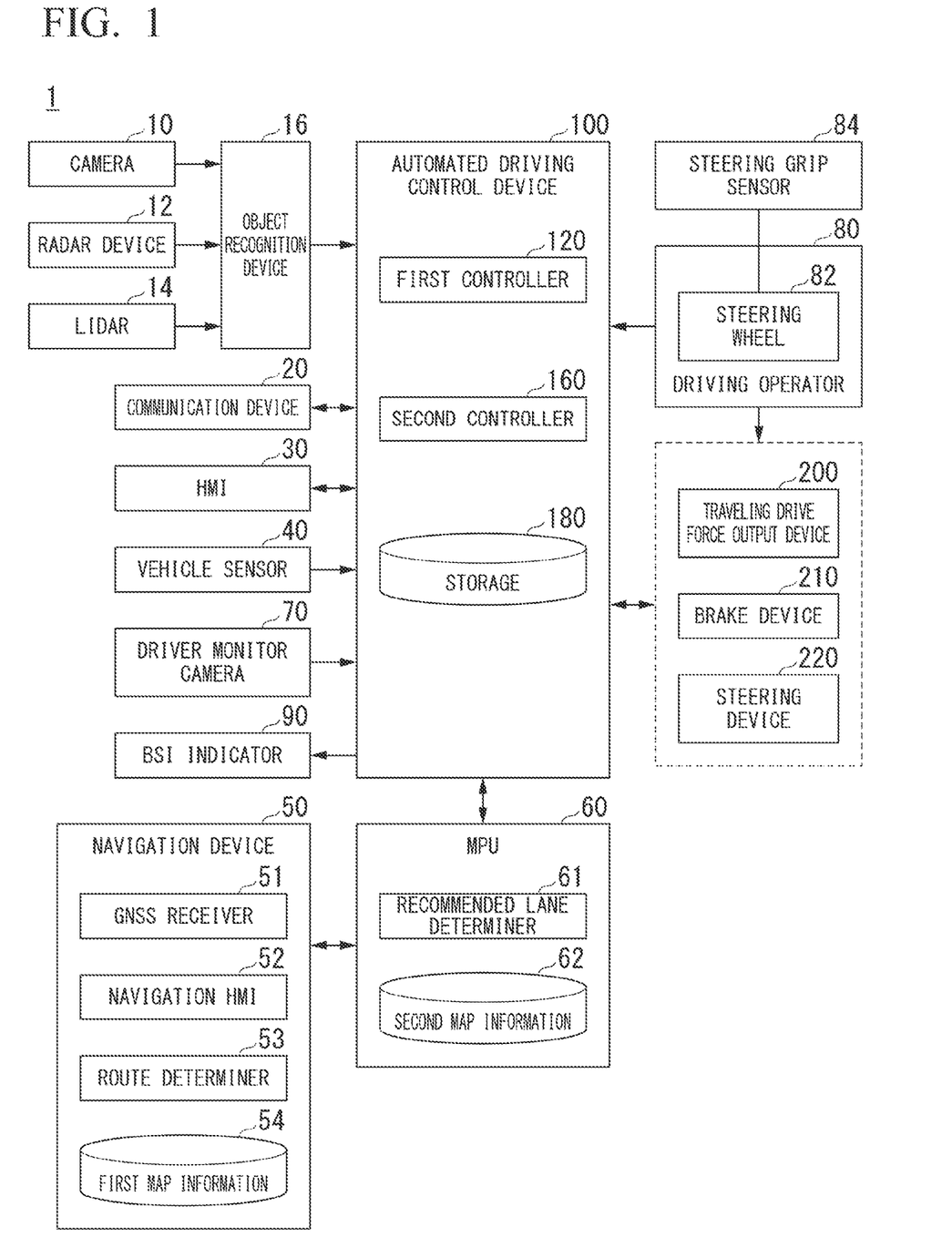
FIG. 1 is a configuration diagram of a vehicle system using a vehicle control device according to an embodiment.

Hereinafter, embodiments of a vehicle control device, a vehicle control method, and a storage medium of the present invention will be described with reference to the drawings.
Overall Configuration FIG. 1 is a configuration diagram of a vehicle system 1 using a vehicle control device according to an embodiment. A vehicle (hereinafter, an own vehicle M) having the vehicle system 1 mounted therein is, for example, a two-wheeled, three-wheeled, or four-wheeled vehicle, and a drive source thereof is an internal combustion engine such as a diesel engine or a gasoline engine, a motor, or a combination thereof. The motor is operated by using power generated by a generator connected to the internal combustion engine or power released from a secondary battery or a fuel cell.

The vehicle system 1 includes, for example, a camera 10, a radar device 12, light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, a blind spot information (BSI) indicator 90, an automated driving control device 100, a traveling drive force output device 200, a brake device 210, and a steering device 220. The devices and the apparatuses are connected to each other via a multiplex communication line such as a Controller Area Network (CAN) communication line, a serial communication line, or a wireless communication network. The configuration shown in FIG. 1 is only an example, and some of the constituents may be omitted, and other constituents may be added. The automated driving control device 100 is an example of a "vehicle control device".

The camera 10 is a digital camera using a solid-state imaging element such as a charge coupled device (CCD) or a complementary metal oxide semiconductor (CMOS). The camera 10 is attached at any location in a vehicle in which the vehicle system 1 is mounted. For example, in a case of imaging the front in the own vehicle M, the camera 10 is attached to the upper part of a front windshield, the back surface of a rearview mirror, or the like. In a case of imaging the rear of the own vehicle M, the camera 10 is attached to the upper part of a rear windshield or the like. In a case of imaging the right side or the left side of the own vehicle M, the camera 10 is attached to a vehicle body or a right-side surface or a left side surface of a door mirror. The camera 10 periodically and repeatedly captures images of the periphery of the own vehicle M. The camera 10 may be a stereo camera.

The radar device 12 radiates electric waves such as millimeter waves in the surroundings of the own vehicle M, detects electric waves (reflected waves) reflected by an object, and thus detects at least a position of (a distance to and an azimuth of) the object. The radar device 12 is attached at any location in the own vehicle M. The radar device 12 may detect a position and a speed of an object according to a frequency modulated continuous wave (FM-CW) method.

The LIDAR 14 applies light (or an electromagnetic wave with a wavelength close to that of the light) in the surroundings of the own vehicle M, and measures scattered light. The LIDAR 14 detects a distance to a target on the basis of a time from light emission to light reception. The applied light is, for example, pulsed laser light. The LIDAR 14 is attached at any location in the own vehicle M.

The object recognition device 16 performs a sensor fusion process on detection results from some or all of the camera 10, the radar device 12, and the LIDAR 14, and thus recognizes a position, the type (attribute), a speed, and the like of an object. The object recognition device 16 outputs a recognition result to the automated driving control device 100. The object recognition device 16 may output detection results from the camera 10, the radar device 12, and the LIDAR 14 to the automated driving control device 100 without change. The object recognition device 16 may be omitted from the vehicle system 1.

The communication device 20 performs communication with another vehicle present in the surroundings of the own vehicle M or performs communication with various server apparatuses via a wireless base station by using, for example, a cellular network, a Wi-Fi network, Bluetooth (registered trademark), or dedicated short range communication (DSRC).

The HMI 30 presents various types of information to an occupant (including a driver) of the own vehicle M, and also receives an input operation from the occupant. For example, the HMI 30 may include a display device, a switch, a speaker, a buzzer, a touch panel, and the like. For example, the occupant inputs a destination of the own vehicle M to the HMI 30. The HMI 30 is an example of an "outputter".

The vehicle sensor 40 includes a vehicle speed sensor that detects a speed of the own vehicle M, an acceleration sensor that detects acceleration, a gyro sensor that detects angular velocity, an azimuth sensor that detects an orientation of the own vehicle M, and the like. The gyro sensor may include, for example, a yaw rate sensor that detects an angular velocity about a vertical axis.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 receives electric waves from each of a plurality of GNSS satellites (artificial satellites) and specifies a position of the own vehicle M on the basis of signals of the received electric waves. The GNSS receiver 51 outputs the specified position of the own vehicle M to the route determiner 53, or outputs the position directly to the automated driving control device 100 or indirectly via the MPU 60. A position of the own vehicle M may be specified or complemented by an inertial navigation system (INS) using an output from the vehicle sensor 40.

The navigation HMI 52 includes a display device, a speaker, a touch panel, keys, and the like. The navigation HMI 52 may be partially or entirely integrated into the HMI 30 described above. For example, an occupant may enter a destination of the own vehicle M to the navigation HMI 52 instead of or in addition to inputting the destination of the own vehicle M to the HMI 30.

The route determiner 53 determines, for example, a route (hereinafter, a route on a map) from a position of the own vehicle M specified by the GNSS receiver 51 (or any entered position) to a destination that is entered by an occupant by using the HMI 30 or the navigation HMI 52 on the basis of the first map information 54.

The first map information 54 is, for example, information in which a road shape is expressed by a link indicating a road and nodes connected to each other via the link. The first map information 54 may include a curvature of a road, point of interest (POI) information, and the like. The route on the map is output to MPU 60.

The navigation device 50 may perform route guidance using the navigation HMI 52 on the basis of the route on the map. The navigation device 50 may be implemented, for example, by a function of a terminal apparatus such as a smartphone or a tablet terminal carried by the occupant. The navigation device 50 may transmit the current position and the destination to a navigation server via the communication device 20 and may acquire a route equivalent to the route on the map from the navigation server.

The MPU 60 includes, for example, a recommended lane determiner 61, and stores second map information 62 in a storage device such as an HDD or a flash memory. The recommended lane determiner 61 is realized by a hardware processor such as a central processing unit (CPU) executing a program (software). The recommended lane determiner 61 may be realized by hardware (a circuit portion; including circuitry) such as a large-scale integration (LSI), an application specific integrated circuit (ASIC), a field-programmable gate array (FPGA), or a graphics processing unit (GPU), and may be realized by software and hardware in cooperation. The program may be stored in advance in a storage device (a storage device provided with a non-transitory storage medium) such as an HDD or a flash memory of the MPU 60 and may be stored in an attachable and detachable storage medium such as a DVD or a CD-ROM and may be installed in the HDD or the storage device of the MPU 60 when the storage medium (non-transitory storage medium) is attached to a drive device.

The recommended lane determiner 61 divides the route on the map provided from the navigation device 50 into a plurality of blocks (for example, divides the route on the map every 100 m in a vehicle advancing direction), and determines a recommended lane for each block by referring to the second map information 62. The recommended lane determiner 61 determines in which lane from the left the own vehicle will travel. In a case where there is a branch location on the route on the map, the recommended lane determiner 61 determines a recommended lane such that the own vehicle M can travel on a reasonable route to advance to a branch destination.

The second map information 62 is map information with higher accuracy than the first map information 54. The second map information 62 includes, for example, information regarding the center of a lane or information regarding a boundary of the lane. The second map information 62 may include road information, traffic regulation information, address information (address/postal code), facility information, telephone number information, and the like. The second map information 62 may be updated at any time by the communication device 20 performing communication with other devices. The driver monitor camera 70 is, for example, a digital camera that uses a solid-state imaging sensor such as a CCD or a CMOS. The driver monitor camera 70 is attached to any position in the own vehicle M at a position and an orientation in which an occupant (that is, a driver) seated on a driver's seat of the own vehicle M can be imaged from the front. For example, the driver monitor camera 70 is attached to an instrument panel of the own vehicle M.

The driving operator 80 includes, for example, an accelerator pedal, a brake pedal, a shift lever, and other operators in addition to a steering wheel 82. A sensor that detects an amount of operation or the presence or absence of operation is attached to the driving operator 80. A detection result from the sensor is output to the automated driving control device 100 or is output to some or all of the traveling drive force output device 200, the brake device 210, and the steering device 220.

The steering wheel 82 does not necessarily have to be annular and may have a form of an odd-shaped steering wheel, a joystick, a button, or the like. A steering grip sensor 84 is attached to the steering wheel 82. The steering grip sensor 84 is a capacitance sensor or the like. The steering grip sensor 84 detects whether or not the driver is gripping the steering wheel 82 (meaning that the driver is in contact with the steering wheel 82 in a state in which a force is being applied thereto), and outputs a signal indicating the detection result to the automated driving control device 100.

The BSI indicator 90 is a driving assistance device that is turned on or flashed in order to notify a driver that the own vehicle M is approaching a surrounding vehicle at the present time or is approaching at a certain point in the future. Since the BSI indicator 90 is turned on or flashed, the driver can be prompted to visually check a vehicle approaching the own vehicle M. The BSI indicator 90 is an example of an "outputter".

Figure 2:
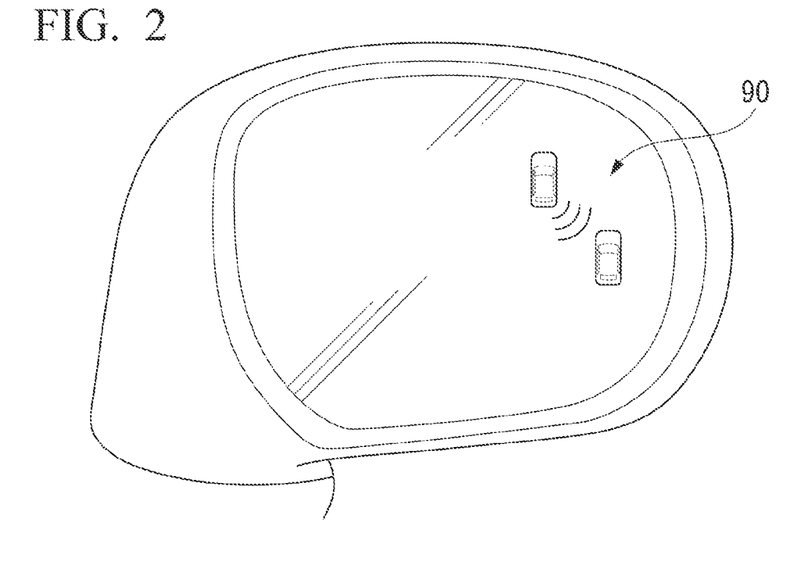
FIG. 2 is a diagram showing an example of a BSI indicator.
Figure 3:
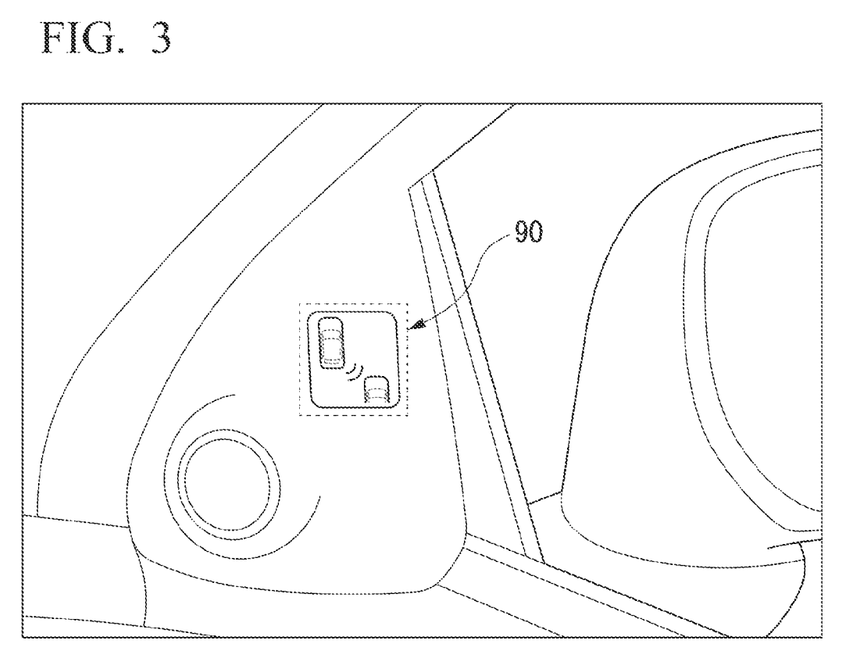
FIG. 3 is a diagram showing another example of the BSI indicator.

FIGS. 2 and 3 are diagrams showing an example of the BSI indicator 90. The BSI indicator 90 may be embedded in the mirror surface of the door mirror as in the example in FIG. 2 or may be installed in the vicinity of the door mirror in the vehicle cabin as in the example in FIG. 3. Hereinafter, as an example, the BSI indicator 90 will be described as being embedded in the mirror surface of the door mirror.

The automated driving control device 100 includes, for example, a first controller 120, a second controller 160, and a storage 180. Each of the first controller 120 and the second controller 160 is realized, for example, by a hardware processor such as a CPU executing a program (software). Some or all of the constituents may be realized by hardware (a circuit portion; including circuitry) such as an LSI, an ASIC, an FPGA, or a GPU, and may be realized by software and hardware in cooperation. The program may be stored in advance in a storage device (a storage device provided with a non-transitory storage medium) such as an HDD or a flash memory of the automated driving control device 100, and may be stored in an attachable and detachable storage medium such as a DVD or a CD-ROM and may be installed in the HDD or the flash memory of the automated driving control device 100 when the storage medium (non-transitory storage medium) is attached to a drive device.

The storage 180 is implemented by, for example, an HDD, a flash memory, an EEPROM, a ROM, a RAM, or the like. The storage 180 stores, for example, a program read and executed by a processor.

Figure 4:
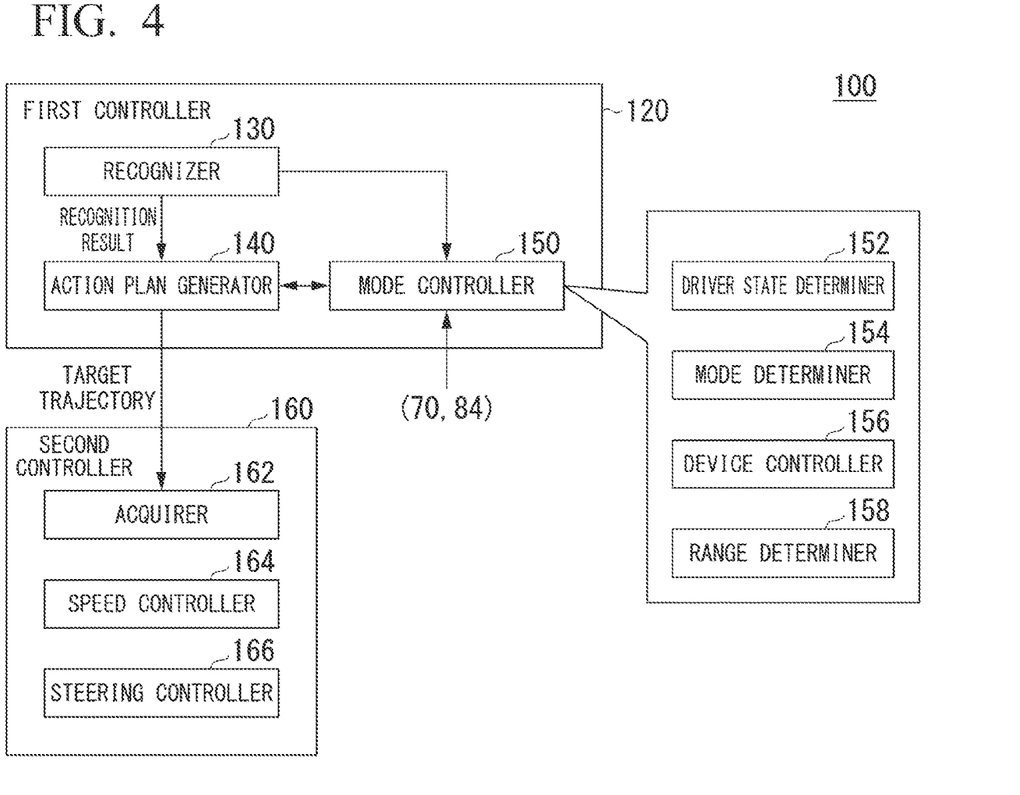
FIG. 4 is a functional configuration diagram of a first controller and a second controller.

FIG. 4 is a functional configuration diagram of the first controller 120 and the second controller 160. The first controller 120 includes, for example, a recognizer 130, an action plan generator 140, and a mode controller 150. A combination of the action plan generator 140 and the second controller 160, or a combination of the action plan generator 140, the mode controller 150, and the second controller 160 is an example of a "driving controller".

The first controller 120 is realized by combining, for example, a function of artificial intelligence (AI) with a function of a model provided in advance. For example, a function of "recognizing an intersection" may be realized by executing recognition of the intersection using deep learning and recognition based on conditions (for example, there are a signal that can be matched with a pattern, and a road marking) given in advance in parallel and scoring and comprehensively evaluating both of recognition results. This ensures the reliability of automated driving.

The recognizer 130 recognizes situations or environments in the surroundings of the own vehicle M. For example, the recognizer 130 recognizes an object present in the surroundings of the own vehicle M on the basis of information input from the camera 10, the radar device 12, and the LIDAR 14 via the object recognition device 16. Objects recognized by the recognizer 130 include, for example, bicycles, motorcycles, four-wheeled vehicles, pedestrians, road signs, road markings, lane markings, utility poles, guardrails, and falling objects. The recognizer 130 recognizes states of the object such as a position, a speed, and an acceleration. The position of the object is recognized as, for example, a position (that is, a relative position with respect to the own vehicle M) in a relative coordinate system having a representative point (for example, the centroid or the drive axis center) of the own vehicle M as an origin and is used for control. The position of the object may be represented by a representative point such as the centroid or a corner of the object and may be represented by an expressed region. The "states" of the object may include an acceleration, a jerk, or an "action state" of the object (for example, whether or not the object is changing lanes or trying to change lanes).

The recognizer 130 recognizes, for example, a lane in which the own vehicle M is present or traveling (hereinafter, an own lane) and an adjacent lane that is adjacent to the own lane. For example, the recognizer 130 acquires the second map information 62 from the MPU 60, compares a pattern (for example, an arrangement of solid lines and dashed lines) of road lane markings included in the obtained the second map information 62 with a pattern of road lane markings in the surroundings of the own vehicle M recognized from an image captured by the camera 10, and thus recognizes a space between the lane markings as an own lane or an adjacent lane.

The recognizer 130 is not limited to a road lane marking and may recognize a boundary representing a lane boundary (road boundary) such as a road lane marking, a road shoulder, a curb, a median strip, and a guardrail, to recognize lanes such as an own lane or an adjacent lane. In this recognition, a position of the own vehicle M acquired from the navigation device 50 or a process result from an INS may be taken into consideration. The recognizer 130 recognizes a temporary stop line, an obstacle, a red light, a tollgate, or other road events.

When the own lane is recognized, the recognizer 130 recognizes a relative position and a posture of the own vehicle M with respect to the own lane. The recognizer 130 may recognize, for example, a deviation of a reference point of the own vehicle M from the lane center and an angle formed with a line connecting coordinate points of the lane centers in an advancing direction of the own vehicle M as a relative position and a posture of the own vehicle M with respect to the own lane. Alternatively, the recognizer 130 may recognize a position or the like of the reference point of the own vehicle M with respect to either of side ends (road lane markings or road boundaries) of the own lane as the relative position of the own vehicle M with respect to the own lane.

The action plan generator 140 generates target trajectories in which the own vehicle M automatedly (regardless of an operation of a driver) travels in the future in a state during traveling defined by an event that will be described later such that the own vehicle M can travel in a recommended lane determined by the recommended lane determiner 61 in principle and can also cope with a surrounding situation of the own vehicle M.

The target trajectory includes, for example, a speed element. For example, the target trajectory is expressed by sequentially arranging locations (trajectory points) to be reached by the own vehicle M. The trajectory points are locations to be reached by the own vehicle M every predetermined traveling distance (for example, about several [m]) in terms of a distance along a road, and, separately therefrom, a target speed and a target acceleration for each predetermined sampling time (for example, any of about 0.1 to 0.9 seconds) are generated as parts of the target trajectory. A trajectory point may be a position to be reached by the own vehicle M at a sampling time point every predetermined sampling time. In this case, information regarding the target speed or the target acceleration may be expressed by an interval between trajectory points.

The action plan generator 140 may generate a target trajectory in which the own vehicle M exceptionally travels in another lane different from a recommended lane (for example, a lane adjacent to the recommended lane) in order to cope with the surrounding situation of the own vehicle M. That is, a priority of other lanes other than the recommended lane is relatively lower than a priority of the recommended lane. For example, the recommended lane has the highest priority (priority 1), another lane (hereinafter, an adjacent lane) adjacent to the recommended lane has the second highest priority (priority 2), and still another adjacent lane that is adjacent to the adjacent lane has the third highest priority (priority 3). As described above, the action plan generator 140 generates a target trajectory in which the own vehicle M travels in the recommended lane having the highest priority in principle, and generates a target trajectory in which the own vehicle M exceptionally travels in another lane having a lower priority than that of the recommended lane depending on a surrounding situation of the own vehicle M.

The action plan generator 140 determines an automated driving event (including partial driving assistance) on a route where the recommended lane is determined when generating the target trajectory. The automated driving event is information defining a behavior that the own vehicle M has to take under automated driving (partial driving assistance), that is, the state during traveling (or a mode during traveling).

The automated driving event includes, for example, a constant speed traveling event, a low speed following traveling event, a lane change event, and a passing event. The constant speed traveling event is an event in which the own vehicle M travels in the same lane at a constant speed. The low speed following traveling event is an event in which the own vehicle M follows another vehicle (hereinafter, referred to as a preceding vehicle) that is present within a predetermined distance (for example, within 100 m) in front of the own vehicle M and is closest to the own vehicle M. The "following" may be, for example, a traveling state in which a relative distance (inter-vehicle distance) between the own vehicle M and the preceding vehicle is kept constant, or a traveling state in which the own vehicle M travels in the center of the own lane in addition to keeping the relative distance between the own vehicle M and the preceding vehicle constant. The lane change event is an event in which a lane of the own vehicle M is changed from the own lane to an adjacent lane. The passing event is an event in which the own vehicle M temporarily changes a lane to an adjacent lane, passes the preceding vehicle in the adjacent lane, and then performs a lane change from the adjacent lane to the original lane again.

The automated driving event further includes a branching event, a merging event, a lane reduction event, a takeover event, and the like. The branching event is an event in which, in a case where the own vehicle M is traveling in a main lane and a destination thereof is located on an extension of a branch line (hereinafter, a branch lane) branched from the main lane, the own vehicle M is guided to change a lane from the main lane to the branch lane at a branch location. The merging event is an event in which, in a case where the own vehicle M is traveling on a branch line (hereinafter, a merging lane) which merges into a main lane and a destination thereof is located on an extension of the main lane, the own vehicle M is guided to change a lane from the merging lane to the main lane at a merging location. The lane reduction event is an event in which the own vehicle M changes a lane to another lane when traveling on a route in which the number of lanes is decreasing on the way. The takeover event is an event for finishing an automated driving mode (a mode A that will be described later) and switching to a driving assistance mode (a mode B, C, or D that will be described later) or a manual driving mode (a mode E that will be described later). For example, a lane marking may be interrupted in front of a tollhouse on an expressway, and a relative position of the own vehicle M may not be recognized. In such a case, a takeover event is determined (planned) for a section in front of the tollhouse.

The action plan generator 140 sequentially determines these plurality of events on the route to the destination, and generates a target trajectory for causing the own vehicle M to travel in a state defined by each event while considering a surrounding situation of the own vehicle M.

The mode controller 150 determines a driving mode of the own vehicle M to be one of a plurality of driving modes. The plurality of driving modes respectively have different tasks imposed on a driver. The mode controller 150 includes, for example, a driver state determiner 152, a mode determiner 154, a device controller 156, and a range determiner 158. Individual functions thereof will be described later. A combination of the driver monitor camera 70 and the driver state determiner 152 is an example of a "detector". The device controller 156 is an example of an "output controller".

Figure 5:
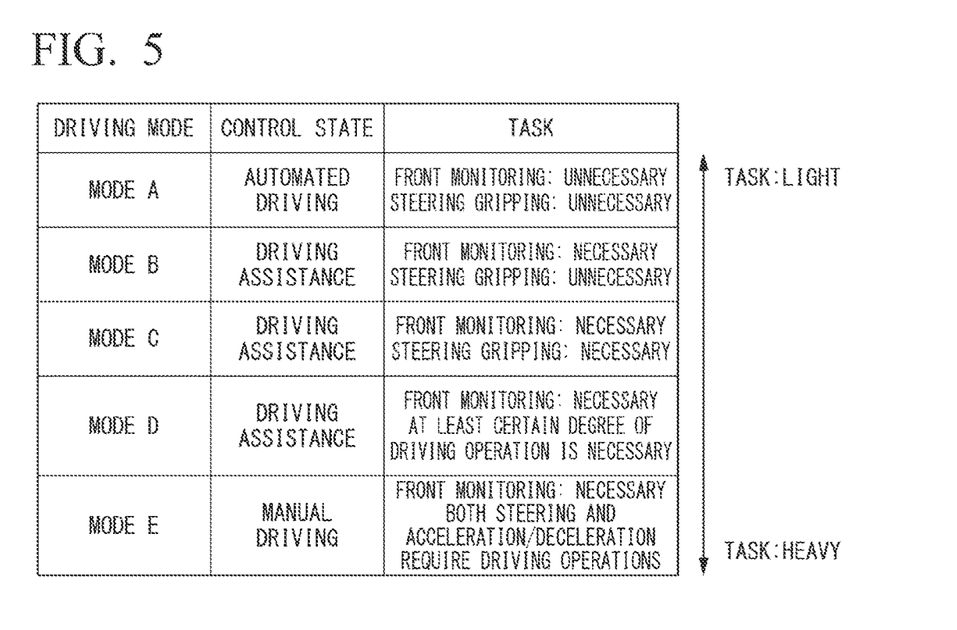
FIG. 5 is a diagram showing an example of a correspondence relationship between a driving mode, a control state of an own vehicle M, and a task.

FIG. 5 is a diagram showing an example of a correspondence relationship between a driving mode, a control state of the own vehicle M, and a task. Driving modes of the own vehicle M include, for example, five modes from the mode A to the mode E. A control state, that is, the degree of automation (control level) of driving control for the own vehicle M is highest in the mode A, then becomes lower in the order of the mode B, the mode C, and the mode D, and is lowest in the mode E. In contrast, a task imposed on a driver is lightest in the mode A, then becomes heavier in the order of the mode B, the mode C, and the mode D, and is heaviest in the mode E. In the modes D and E, the vehicle is in a control state that is not automated driving, and thus the automated driving control device 100 is responsible for finishing control related to automated driving and transitioning to driving assistance or manual driving. Hereinafter, details of each driving mode will be exemplified.

In the mode A, the vehicle is in an automated driving state, and neither the front monitoring nor the gripping of the steering wheel 82 (steering gripping in the figure) is imposed on the driver. However, even in mode A, the driver is required to be in a posture to quickly transition to manual driving in response to a request from the system centered on the automated driving control device 100. The term "automated driving" as used herein means that both steering and acceleration/deceleration are controlled without depending on the driver's operation. The front means the space in the traveling direction of the own vehicle M that is visually recognized through the front windshield. The mode A is a driving mode that is executable in a case of satisfying a condition that the own vehicle M is traveling at a predetermined speed (for example, about 50 km/h]) or less on a motorway such as an expressway and there is a preceding vehicle that is a following target and may be referred to as traffic jam pilot (TJP). In a case where this condition is no longer satisfied, the mode controller 150 changes a driving mode of the own vehicle M to the mode B.

In the mode B, the vehicle is in a driving assistance state, and the task of monitoring the front in the own vehicle M (hereinafter, front monitoring) is imposed on the driver, but the task of gripping the steering wheel 82 is not imposed on the driver. In the mode C, the vehicle is in a driving assistance state, and the task of front monitoring and the task of gripping the steering wheel 82 are imposed on the driver. The mode D is a driving mode that requires a certain degree of driving operation by the driver with respect to at least one of steering and acceleration/deceleration of the own vehicle M. For example, in the mode D, driving assistance such as adaptive cruise control (ACC) or lane keeping assist system (LKAS) is provided. In the mode E, the vehicle is in a manual operation state in which both steering and acceleration/deceleration require driving operations by the driver. In both the mode D and the mode E, the task of monitoring the front in the own vehicle M is naturally imposed on the driver.

The automated driving control device 100 (and a driving assistance device (not shown)) executes an automated lane change according to a driving mode. The automated lane change includes an automated lane change (1) according to a system request and an automated lane change (2) according to a driver request. The automated lane change (1) includes an automated lane change for passing in a case where a speed of a preceding vehicle is lower than a speed of the own vehicle by a reference or more and an automated lane change for advancing toward a destination (an automated lane change due to a change of a recommended lane). The automated lane change (2) is to change a lane of the own vehicle M toward an operation direction when the direction indicator is operated by the driver in a case where conditions related to a speed or a positional relationship with surrounding vehicles are satisfied.

The automated driving control device 100 does not execute either the automated lane change (1) or (2) in the mode A. The automated driving control device 100 executes both the automated lane change (1) and (2) in modes B and C. The driving assistance device (not shown) does not execute the automated lane change (1) but executes the automated lane change (2) in the mode D. In the mode E, neither automated lane change (1) nor (2) is executed.

FIG. 4 will be referred to again. The mode controller 150 changes a driving mode of the own vehicle M to a driving mode in which the task is heavier in a case where the task related to the determined driving mode is not executed by the driver.

For example, in the mode A, in a case where the driver is in a posture where the driver cannot transition to manual driving in response to a request from the system (for example, in a case where the driver continues to look outside an allowable range θ that will be described later or a sign that driving becomes difficult is detected), the mode controller 150 uses the HMI 30 to prompt the driver to transition to manual driving, and if the driver does not respond, the mode controller 150 performs control of gradually bringing the own vehicle M to a road shoulder and stopping the own vehicle M to stop the automated driving. After the automated driving is stopped, the own vehicle is in the mode D or E, and the own vehicle M can be started by a manual operation of the driver. Hereinafter, the same applies to "stop automated driving". In a case where the driver is not monitoring the front in the mode B, the mode controller 150 uses the HMI 30 to prompt the driver to monitor the front, and if the driver does not respond, the mode controller 150 performs control of gradually bringing the own vehicle M to a road shoulder and stopping the own vehicle M to stop the automated driving. In the mode C, in a case where the driver is not monitoring the front or is not gripping the steering wheel 82, the mode controller 150 uses the HMI 30 to prompt the driver to monitor the front and/or grip the steering wheel 82, and if the driver does not respond, the mode controller 150 performs control of gradually bringing the own vehicle M to a road shoulder and stopping the own vehicle M to stop the automated driving.

The driver state determiner 152 determines whether or not the driver is in a state of being able to perform a task on the basis of an image from the driver monitor camera 70 and a detection signal from the steering grip sensor 84 in order to perform the above mode change.

For example, the driver state determiner 152 analyzes the image from the driver monitor camera 70 to estimate a posture of the driver and determines whether or not the driver is in a posture to be able to transition to manual driving in response to a request from the system on the basis of the estimated posture.

The driver state determiner 152 analyzes the image from the driver monitor camera 70 to estimate an orientation of the driver's line of sight or face and determines whether or not the driver is monitoring the front in the own vehicle M on the basis of the estimated orientation of the line of sight or the face.

For example, the driver state determiner 152 detects a positional relationship between the driver's head and eyes, a combination of a reference point and a moving point in the eyes, and the like from the image from the driver monitor camera 70 by using a technique such as template matching. The driver state determiner 152 estimates the orientation of the face on the basis of a relative position of the eyes with respect to the head. The driver state determiner 152 estimates the orientation of the driver's line of sight on the basis of a position of the moving point with respect to the reference point. For example, in a case where the reference point is the inner corner of the eye, the moving point is the iris. In a case where the reference point is the corneal reflex region, the moving point is the pupil.

For example, the mode determiner 154 may determine that the driver is not monitoring the front in the own vehicle M in a case where the driver keeps his/her face or line of sight out of the allowable range θ for a predetermined time or longer.

The driver state determiner 152 determines whether or not the driver is gripping the steering wheel 82 on the basis of a detection signal from the steering grip sensor 84.

The mode determiner 154 determines a driving mode of the own vehicle M according to a determination result from the driver state determiner 152.

The device controller 156 controls the HMI 30, the BSI indicator 90, or the like on the basis of the driving mode of the own vehicle M determined by the mode determiner 154, the determination result from the driver state determiner 152, and the recognition result from the recognizer 130. For example, the device controller 156 causes the HMI 30 to output information for prompting the driver to perform a task corresponding to each driving mode. The device controller 156 turns on or flashes the BSI indicator 90 in a case where the recognizer 130 recognizes that a surrounding vehicle is present in an adjacent lane and the surrounding vehicle is located behind the own vehicle M.

The range determiner 158 determines the allowable range θ on the basis of an orientation of the driver's line of sight or face estimated by the driver state determiner 152. The allowable range θ is an angle range of an orientation of the line of sight or the face to the extent that the driver can be regarded as fulfilling the duty of front monitoring (performing the task of front monitoring). The allowable range θ may be an angle range with respect to the horizontal direction or may be an angle range with respect to both the horizontal direction and the vertical direction.

The second controller 160 controls the traveling drive force output device 200, the brake device 210, and the steering device 220 such that the own vehicle M can pass along the target trajectory generated by the action plan generator 140 as scheduled.

The second controller 160 includes, for example, an acquirer 162, a speed controller 164, and a steering controller 166. The acquirer 162 acquires information regarding the target trajectory (trajectory point) generated by the action plan generator 140 and stores the information in a memory (not shown). The speed controller 164 controls the traveling drive force output device 200 or the brake device 210 on the basis of a speed element included in the target trajectory stored in the memory. The steering controller 166 controls the steering device 220 according to a curved state of the target trajectory stored in the memory. Processes in the speed controller 164 and the steering controller 166 are realized by a combination of, for example, feedforward control and feedback control. As an example, the steering controller 166 executes a combination of feedforward control based on a curvature of a road in front of the own vehicle M and feedback control based on deviation from the target trajectory.

The traveling drive force output device 200 outputs traveling drive force (torque) for traveling of the vehicle to drive wheels. The traveling drive force output device 200 includes, for example, a combination of an internal combustion engine, a motor, and a transmission, and an electronic control unit (ECU) controlling the constituents. The ECU controls the constituents according to information that is input from the second controller 160 or information that is input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information being input from the second controller 160 or information being input from the driving operator 80, such that brake torque corresponding to a braking operation is output to each vehicle wheel. The brake device 210 may include, as a backup, a mechanism transmitting hydraulic pressure generated by operating the brake pedal included in the driving operator 80, to the cylinder via a master cylinder. The brake device 210 is not limited to the above configuration and may be an electronic control type hydraulic brake device that controls an actuator according to information being input from the second controller 160 and thus transmits hydraulic pressure in a master cylinder to the cylinder.

The steering device 220 includes, for example, a steering ECU and an electric motor. The electric motor changes an orientation of a turning wheel by applying force to, for example, a rack-and-pinion mechanism. The steering ECU drives the electric motor on the basis of information being input from the second controller 160 or information being input from the driving operator 80, such that an orientation of the turning wheel is changed.

Overall Process Flow

Figure 6:
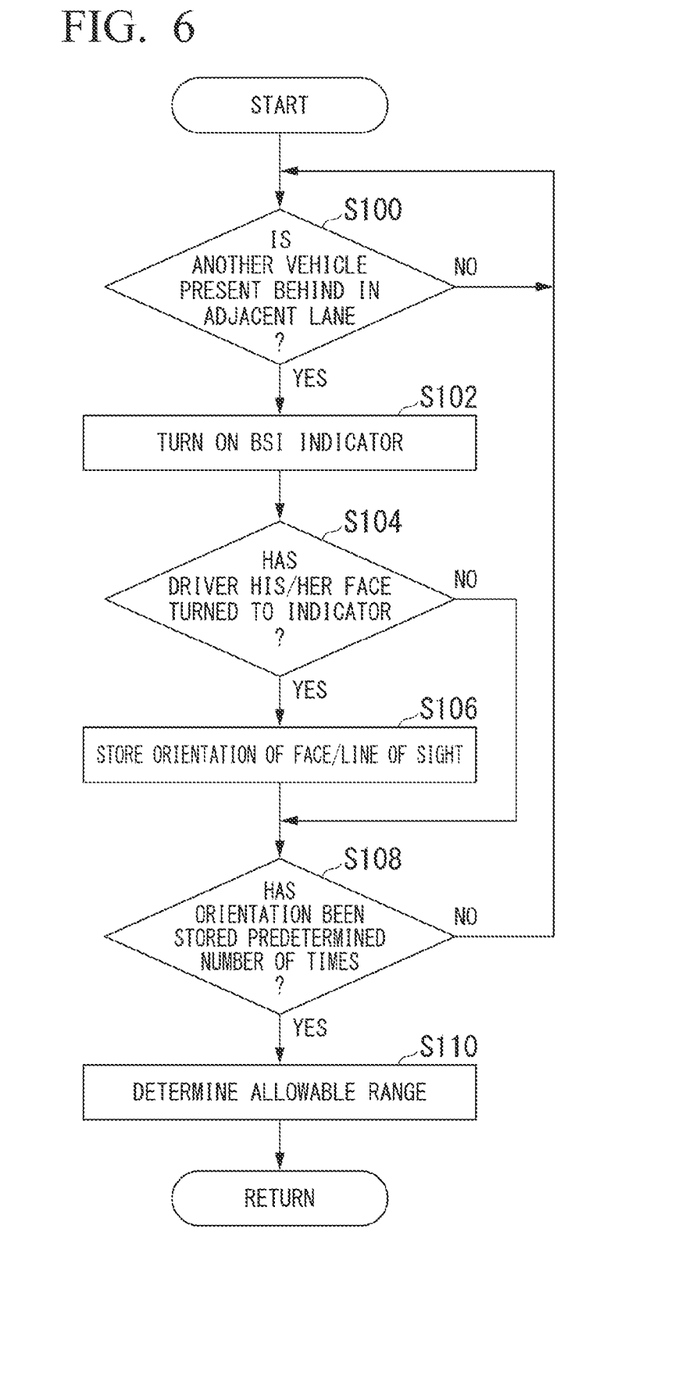
FIG. 6 is a flowchart showing an example of a flow of a series of processes by an automated driving control device of the embodiment.

Hereinafter, a flow of a series of processes in the automated driving control device 100 of the embodiment will be described with reference to a flowchart. FIG. 6 is a flowchart showing an example of a flow of a series of processes by the automated driving control device 100 of the embodiment. The processes in this flowchart may be repeatedly executed in a predetermined cycle. The processes in this flowchart may be executed every time a driver changes.

First, the device controller 156 determines whether or not the recognizer 130 recognizes that a surrounding vehicle is present in an adjacent lane and the surrounding vehicle is present behind the own vehicle M (step S100).

The device controller 156 turns on or flashes the BSI indicator 90 in a case where the recognizer 130 recognizes that the surrounding vehicle is present in the adjacent lane and the surrounding vehicle is present behind the own vehicle M (step S102).

For example, in a case where a surrounding vehicle is present in the left adjacent lane of the own lane and the surrounding vehicle is present behind the own vehicle M, the device controller 156 turns on or flashes the BSI indicator 90 of the right door mirror when viewed from the driver.

Next, the range determiner 158 determines whether or not the driver has turned his/her face or line of sight to the BSI indicator 90 on the basis of an orientation of the driver's line of sight or face estimated by the driver state determiner 152 (step S104).

In a case where the driver turns his/her face or line of sight to the BSI indicator 90, the range determiner 158 stores an orientation of the face or the line of sight in the storage unit 180 (step S106).

On the other hand, in a case where the driver does not turn his face or line of sight to the BSI indicator 90, the range determiner 158 skips S106 and proceeds to S108.

Next, the range determiner 158 determines whether or not the process of storing the orientation of the face or the line of sight in the storage unit 180 (that is, the process in S106) has been repeatedly performed a predetermined number of times (for example, 10 times) (step S108).

For example, the range determiner 158 determines whether or not the process in S106 has been repeatedly performed a predetermined number of times for each of the right and left BSI indicators 90.

In a case where the process in S106 has not been repeatedly performed a predetermined number of times for each of the right and left BSI indicators 90, the range determiner 158 returns the process to S100 and repeatedly performs a series of processes from S100 to S106.

On the other hand, in a case where the process in S106 has been repeatedly performed a predetermined number of times for each of the right and left BSI indicators 90, the range determiner 158 determines allowable range θ on the basis of the orientation of the face or the line of sight stored in the storage unit 180 for the predetermined number of times (step S110). Consequently, the process in this flowchart is finished.

Figure 7:
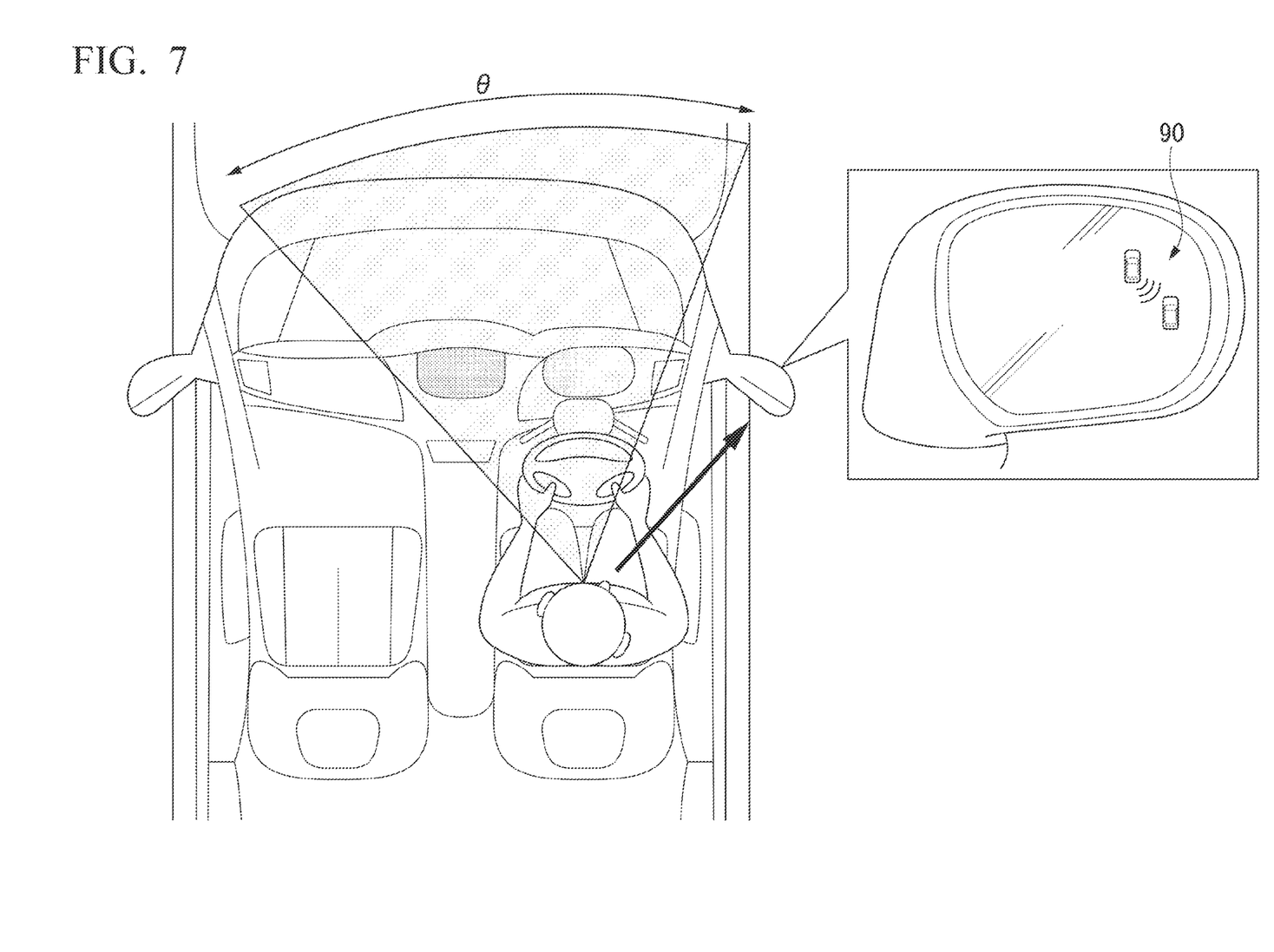
FIG. 7 is a diagram for describing a method of determining an allowable range.
Figure 8:
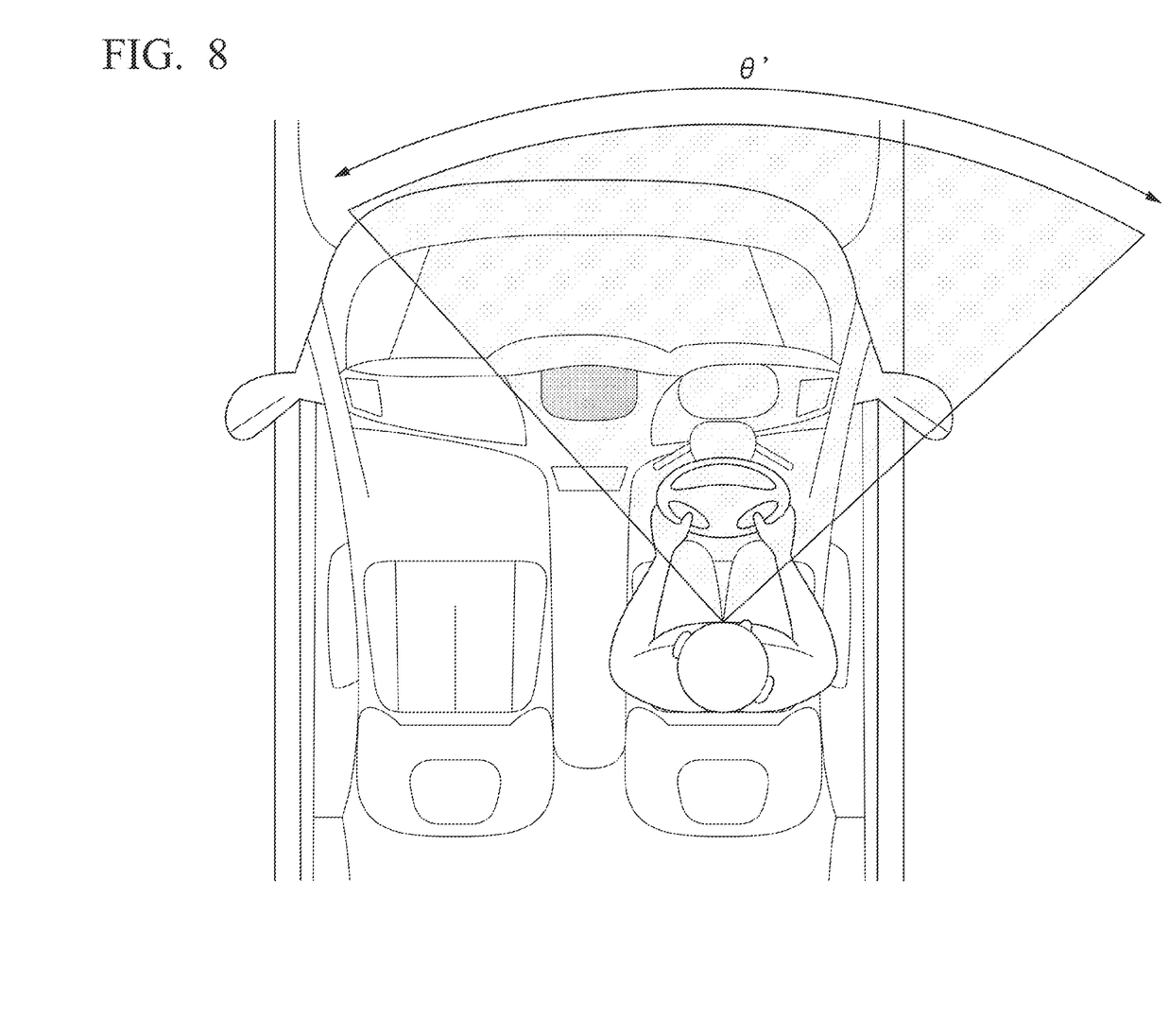
FIG. 8 is a diagram for describing a method of determining an allowable range.

FIGS. 7 and 8 are diagrams for describing a method of determining the allowable range θ. As shown in FIG. 7, the allowable range θ is typically set to include the front window shield as a target space for front monitoring. For example, in a case where an orientation of the line of sight or the face of the driver is not within the allowable range θ, the driver state determiner 152 determines that the driver is not monitoring the front in the own vehicle M, and in a case where an orientation of the line of sight or the face of the driver is within the allowable range θ, determines that the driver is monitoring the front in the own vehicle M.

As described above, in a case where the driver is not monitoring the front, the mode determiner 154 changes the driving mode of the own vehicle M to a driving mode with a lower degree of automation (control level). In the example in FIG. 7, the driver turns his/her line of sight or face to the right door mirror where the BSI indicator 90 lights. In such a case, if the uniform allowable range θ is used, an orientation of the driver's line of sight or face is not within the allowable range θ, and it is determined that the driver has neglected the task of front monitoring (that is, looking aside) such that the driving mode may switch. The BSI indicator 90 notifies the driver of a surrounding vehicle in the adjacent lane approaching from behind the own vehicle M and is common from the viewpoint of the task of front monitoring required under a specific driving mode and alerting. Thus, turning the line of sight or the face to the BSI indicator 90 is preferably handled as a part of the task of front monitoring rather than as looking aside.

In response to this, in the present embodiment, in a case where the driver turns his/her line of sight or face to the BSI indicator 90 after the BSI indicator 90 lights, the range determiner 158 determines a range expanded to the orientation of the line of sight or the face as a new allowable range θ'. In the example in FIG. 7, since the driver turns his/her line of sight or face to the right door mirror where the BSI indicator 90 is lighting, the range determiner 158 extends the allowable range θ such that the right door mirror is included and sets the expanded range as the new allowable range θ'. In a case where the BSI indicator 90 of the left door mirror is lighting and the driver turns his/her line of sight or face to the left BSI indicator 90, the range determiner 158 expands the allowable range θ such that the right door mirror is included, and sets the expanded range as the new allowable range θ'.

In this case, the range determiner 158 may determine to what degree the allowable range θ is expanded on the basis of the number of times (or time) for which the driver turns his/her line of sight or face to the BSI indicator 90 when expanding the allowable range θ. For example, the range determiner 158 may expand the allowable range θ more widely as the driver turns his line of sight or face to the BSI indicator 90 more times (or for a longer period of time).

By expanding the allowable range θ as described above, even if the driver turns his face or line of sight to the BSI indicator 90, it becomes easier to determine that the driver is performing the task of front monitoring. As a result, frequent switching between driving modes is suppressed, and thus more comfortable automated driving can be executed.

According to the Embodiment Described Above, the Automated Driving Control device 100 recognizes a surrounding vehicle present in the surroundings of the own vehicle M, estimates an orientation of a face or a line of sight of a driver of the own vehicle M from an image captured by the driver monitor camera 70, turns on or flashes the BSI indicator 90 on the basis of a position of the surrounding vehicle present in an adjacent lane, reduces a level of automated driving in a case where the face or the line of sight of the driver is not within the allowable range θ, and expands the allowable range θ on the basis of an orientation of the face or the line of sight of the driver after turning on or flashing the BSI indicator 90. Consequently, it is possible to improve the determination accuracy of front monitoring by the driver. As a result, frequent switching between driving modes is suppressed, and thus more comfortable automated driving can be executed.

Hardware Configuration

Figure 9:
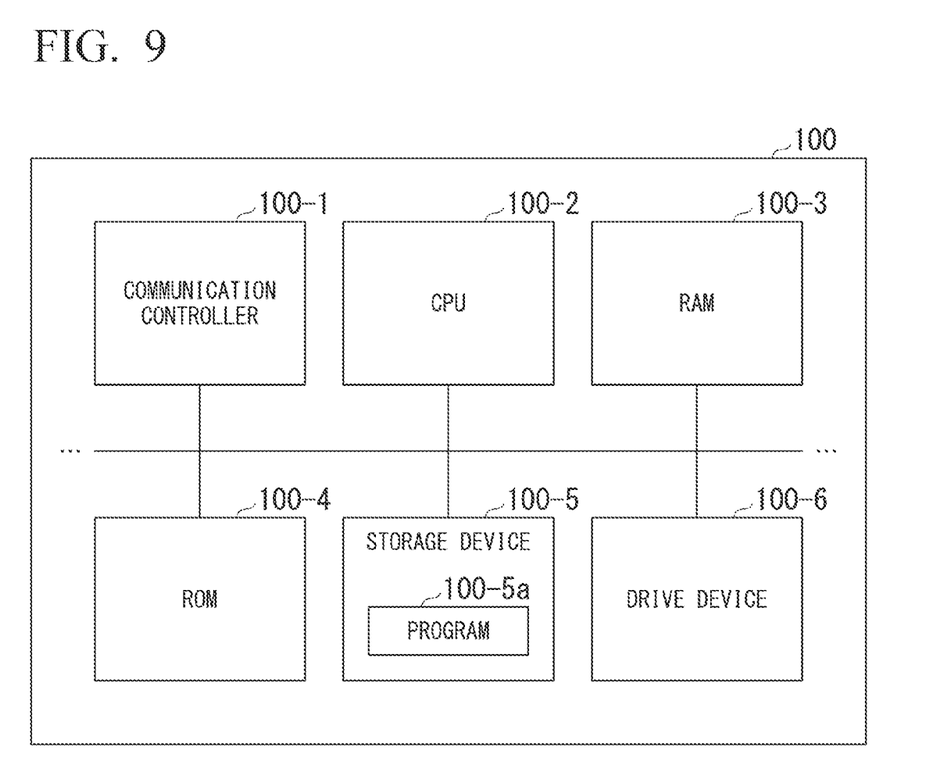
FIG. 9 is a diagram showing an example of a hardware configuration of the automated driving control device of the embodiment.

FIG. 9 is a diagram showing an example of a hardware configuration of the automated driving control device 100 of the embodiment. As shown in FIG. 9, the automated driving control device 100 is configured to include a communication controller 100-1, a CPU 100-2, a RAM 100-3 used as a working memory, a ROM 100-4 storing a boot program or the like, a storage device 100-5 such as a flash memory or an HDD, and a drive device 100-6 that are connected to each other via an internal bus or a dedicated communication line. The communication controller 100-1 performs communication with constituents other than the automated driving control device 100. The storage device 100-5 stores a program 100-5a executed by the CPU 100-2. The program is loaded to the RAM 100-3 by a direct memory access (DMA) controller (not shown) or the like and is executed by the CPU 100-2. Consequently, at least one of the first controller 120 and the second controller 160 is realized.

The embodiment described above may be expressed as follows.

A vehicle control device including:
a storage medium storing computer-readable instructions; and
a processor connected to the storage medium,
in which the processor executes the computer-readable instructions to be configured to
recognize another vehicle present in the surroundings of an own vehicle,
detect an orientation of a face or a line of sight of a driver of the own vehicle,
cause an outputter to, on the basis of a position of the recognized other vehicle present in a second lane adjacent to a first lane in which the own vehicle is present, output predetermined information indicating that the other vehicle is present in the second lane,
perform automated driving for controlling at least one of a speed or steering of the own vehicle on the basis of the recognition result of the other vehicle and the detection result of the orientation of the face or the line of sight of the driver, and reduce a level of the automated driving in a case where the detected orientation is not within an allowable range, and
determine the allowable range on the basis of the orientation detected after the predetermined information is output by the outputter.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. A vehicle control device comprising:
a processor configured to:
recognize, as a recognition result, an other vehicle present in the surroundings of an own vehicle;
detect, as a detection result, an orientation of a face or a line of sight of a driver of the own vehicle;
determine, as a determination result, whether or not the orientation is within an allowable range;
change the allowable range on the basis of the detection result;
cause an output interface to, on the basis of a position of the other vehicle and present in a second lane adjacent to a first lane in which the own vehicle is present, output predetermined information indicating that the other vehicle is present in the second lane;
perform automated driving for controlling at least one of a speed or steering of the own vehicle on the basis of the recognition result and the determination result, and
reduce a level of the automated driving in a case where it is determined that the orientation is not within the allowable range;
wherein the processor is further configured to:
change a width of the allowable range on the basis of the orientation after the predetermined information is output by the output interface; and
perform the automated driving on the basis of the allowable range in which the width of the allowable range has been changed.

2. The vehicle control device according to claim 1,
wherein the output interface is an indicator installed on a mirror surface of a door mirror of the own vehicle or near the door mirror in a vehicle cabin of the own vehicle,
wherein the processor is further configured to:
in a case that the other vehicle is present behind the own vehicle in the second lane, turn on or flash the indicator, and
change the width of the allowable range such that the allowable range includes the indicator in a case that the driver has turned his/her face or line of sight to the indicator after turning on or flashing of the indicator.

3. The vehicle control device according to claim 1,
wherein the output interface is an indicator for notifying the driver, and
wherein the processor is further configured to change the width of the allowable range in a case where the number of times for which the driver turns his/her face or line of sight to the indicator reaches a predetermined number of times.

4. The vehicle control device according to claim 1,
wherein the processor is further configured to reduce the level of the automated driving in a case where the driver keeps his/her face or line of sight out of the allowable range for a predetermined time or longer.

5. The vehicle control device according to claim 1,
wherein the output interface is an indicator for notifying the driver,
wherein the processor is further configured to:
  determine whether or not the driver has turned his/her face or line of sight to the indicator on the basis of the orientation detected after the predetermined information is output by the indicator, and
  change the width of the allowable range in a case that the driver has turned his/her face or line of sight to the indicator.

6. The vehicle control device according to claim 1, wherein the processor is configured to expand the allowable range.

7. The vehicle control device according to claim 6, wherein the processor is configured to expand the allowable range in a width direction of the own vehicle.

8. The vehicle control device according to claim 7,
wherein the output interface includes a right indicator and a left indicator, the right indicator being an indicator located on a right side of the own vehicle when looking forward from a driver's seat of the own vehicle, the left indicator being an indicator located on a left side of the own vehicle when looking forward from the driver's seat of the own vehicle,
wherein the processor is further configured to:
  expand the right side of the allowable range on the basis of the orientation detected after the predetermined information is output by the right indicator, and
  expand the left side of the allowable range on the basis of the orientation detected after the predetermined information is output by the left indicator.

9. A vehicle control method of causing a computer mounted an own vehicle to:
  recognize an other vehicle present in the surroundings of the own vehicle;
  detect an orientation of a face or a line of sight of a driver of the own vehicle;
  determine whether or not the orientation is within an allowable range;
  change the allowable range on the basis of a detection result of the orientation;
  cause an output interface to, on the basis of a position of the recognized other vehicle present in a second lane adjacent to a first lane in which the own vehicle is present, output predetermined information indicating that the other vehicle is present in the second lane;
  perform automated driving for controlling at least one of a speed or steering of the own vehicle on the basis of a recognition result of the other vehicle and a determination result of whether or not the orientation is within the allowable range; and
  reduce a level of the automated driving in a case where it is determined that the orientation is not within the allowable range;
  change a width of the allowable range on the basis of the orientation detected after the predetermined information is output by the output interface; and
  perform the automated driving on the basis of the allowable range in which the width has been changed.

10. A non-transitory storage medium storing computer-readable instructions for causing a computer mounted on an own vehicle to execute:
  recognizing an other vehicle present in the surroundings of the own vehicle;
  detecting an orientation of a face or a line of sight of a driver of the own vehicle;
  determining whether or not the orientation is within an allowable range;
  changing the allowable range on the basis of a detection result of the orientation;
  causing an output interface to, on the basis of a position of the recognized other vehicle present in a second lane adjacent to a first lane in which the own vehicle is present, output predetermined information indicating that the other vehicle is present in the second lane;
  performing automated driving for controlling at least one of a speed or steering of the own vehicle on the basis of a recognition result of the other vehicle and a determination result of whether or not the orientation is within the allowable range; and
  reducing a level of the automated driving in a case where it is determined that the orientation is not within the allowable range;
  changing a width of the allowable range on the basis of the orientation detected after the predetermined information is output by the output interface; and
  performing the automated driving on the basis of the allowable range in which the width has been changed.

* * * * *